(12) United States Patent
Hatanaka et al.

(10) Patent No.: US 12,736,089 B2
(45) Date of Patent: Sep. 15, 2026

(54) REVERSE-INPUT BLOCKING CLUTCH

(71) Applicant: NSK Ltd., Tokyo (JP)

(72) Inventors: Kazuyuki Hatanaka, Fujisawa (JP); Atsushi Maeda, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 19/487,165

(22) PCT Filed: Feb. 5, 2024

(86) PCT No.: PCT/JP2024/003753
§ 371 (c)(1),
(2) Date: Nov. 24, 2025

(87) PCT Pub. No.: WO2024/247372
PCT Pub. Date: Dec. 5, 2024

(65) Prior Publication Data
US 2026/0110343 A1 Apr. 23, 2026

(30) Foreign Application Priority Data
May 29, 2023 (JP) ................................ 2023-087961

(51) Int. Cl.
*F16D 3/50* (2006.01)
*F16D 3/02* (2006.01)
(Continued)

(52) U.S. Cl.
CPC ................ *F16D 3/50* (2013.01); *F16D 3/02* (2013.01); *F16D 41/06* (2013.01); *F16D 41/10* (2013.01);
(Continued)

(58) Field of Classification Search
CPC ... F16D 3/02; F16D 3/50; F16D 41/06; F16D 2041/0605; F16D 41/08; F16D 41/10;
(Continued)

(56) References Cited

U.S. PATENT DOCUMENTS 1,617,745 A * 2/1927 Cousinard ................ F16D 3/50 192/223.3
2021/0262532 A1 8/2021 Toyoda et al.
(Continued)

FOREIGN PATENT DOCUMENTS

EP 4 265 934 A1 10/2023
WO 2019/026794 A1 2/2019
(Continued)

OTHER PUBLICATIONS

International Search Report for PCT/JP2024/003753, dated Mar. 5, 2024.
(Continued)

*Primary Examiner* — Richard M Lorence
(74) *Attorney, Agent, or Firm* — Sughrue Mion, PLLC

(57) ABSTRACT

A reverse-input blocking clutch includes a leaf spring having: two held portions that is arranged on both sides of an input-side engaging portion of an input member with respect to a second direction perpendicular to a first direction which is a direction of movement of a pressing surface of an engaging element moving away from or toward a pressed surface of a pressed member and a center axis of the input member, and elastically held between the input-side engaging portion and an input-side engaged portion of the engaging member; and a base portion that connects the two held portions.

9 Claims, 16 Drawing Sheets

(51) Int. Cl.

| | |
|---|---|
| ***F16D 41/06*** | (2006.01) |
| ***F16D 41/10*** | (2006.01) |
| ***F16D 43/02*** | (2006.01) |
| ***F16D 51/12*** | (2006.01) |
| ***F16D 59/00*** | (2006.01) |
| ***F16D 67/02*** | (2006.01) |

(52) U.S. Cl.
CPC ............. *F16D 43/02* (2013.01); *F16D 51/12* (2013.01); *F16D 59/00* (2013.01); *F16D 67/02* (2013.01); *F16D 2041/0605* (2013.01)

(58) Field of Classification Search
CPC .......... F16D 43/02; F16D 51/12; F16D 51/22; F16D 51/50; F16D 59/00; F16D 63/00; F16D 67/00; F16D 67/02
See application file for complete search history.

(56) References Cited

U.S. PATENT DOCUMENTS

| | | | | |
|---|---|---|---|---|
| 2021/0277964 | A1 | 9/2021 | Daikoku et al. | |
| 2022/0205495 | A1* | 6/2022 | Dohi | F16D 43/02 |
| 2022/0228630 | A1 | 7/2022 | Dohi et al. | |

FOREIGN PATENT DOCUMENTS

| | | | |
|---|---|---|---|
| WO | 2019/216280 | A1 | 11/2019 |
| WO | 2021/125274 | A1 | 6/2021 |
| WO | 2022/168764 | A1 | 8/2022 |

OTHER PUBLICATIONS

Japanese Decision to Grant a Patent for 2024-516523, dated May 13, 2024.

* cited by examiner

FIG. 11(A)
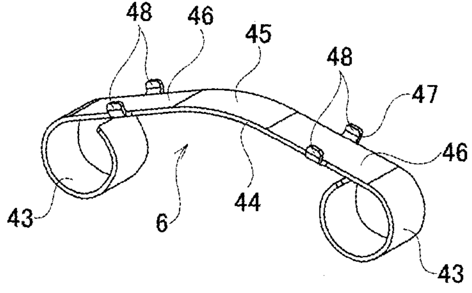
FIG. 11(B)
6
48
47
45
48
46
44
46
43
43
FIG. 11(C)
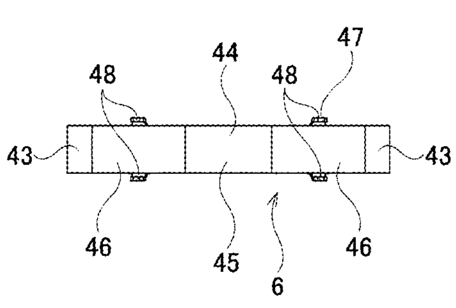
FIG. 11(D)
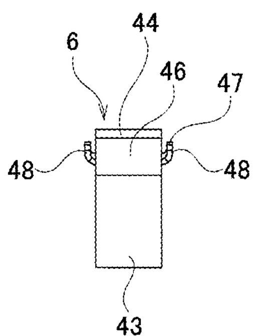

REVERSE-INPUT BLOCKING CLUTCH

CROSS REFERENCE TO RELATED APPLICATIONS

This application is a National Stage of International Application No. PCT/JP2024/003753 filed Feb. 5, 2024, claiming priority based on Japanese Patent Application No. 2023-087961 filed May 29, 2023.

TECHNICAL FIELD

The present disclosure relates to a reverse-input blocking clutch transmitting rotational torque that is input to an input member to an output member, while completely blocking rotational torque that is reversely input to the output member so as not to transmit it to the input member, or transmitting only a part of it to the input member and blocking the remaining part.

BACKGROUND ART

The reverse-input blocking clutch includes an input member that is connected to an input-side mechanism such as a drive source or the like, and an output member that is connected to an output-side mechanism such as a speed-reducing mechanism or the like, and has a function of transmitting rotational torque that is input to the input member to the output member, while completely blocking rotational torque that is reversely input to the output member and not transmitting the reversely input torque to the input member, or transmitting only a part of the reversely input torque to the input member and blocking the remaining part.

The reverse input cutoff clutches is broadly classified into lock type and free type depending on the mechanism for blocking rotational torque input reversely to the output member. A lock type reverse-input blocking clutch includes a mechanism that prevents rotation of the output member when rotational torque is reversely input to the output member. On the other hand, a free type reverse-input blocking clutch includes a mechanism that causes the output member to idle when rotational torque is input to the output member. Whether to use a lock type reverse-input blocking clutch or a free type reverse-input blocking clutch is appropriately determined depending on the intended use of the device incorporating the reverse-input blocking clutch.

WO 2019/026794 A1 discloses a lock type reverse-input blocking clutch. The reverse-input blocking clutch disclosed in WO 2019/026794 A1 includes a pressed member, an input member, an output member, and an engaging element.

The pressed member has a pressed surface around an inner peripheral surface thereof.

The input member has an input-side engaging portion arranged on the inner side in the radial direction of the pressed surface, the input member being coaxially arranged with the pressed surface.

The output member has an output-side engaging portion on the inner side in the radial direction of the pressed surface arranged further on the inner side in the radial direction than the input-side engaging portion, the output member being coaxially arranged with the pressed surface.

The engaging element has a pressing surface facing the pressed surface, an input-side engaged portion engageable with the input-side engaging portion, and an output-side engaged portion engageable with the output-side engaging portion, the engaging element being arranged so as to move in a first direction which is a direction going away from or toward the pressed surface.

In the reverse-input blocking clutch disclosed in WO 2019/026794 A1, when rotational torque is input to the input member, the engaging element moves in a direction away from the pressed surface based on engagement of the input-side engaging portion with the input-side engaged portion, and by engaging the output-side engaged portion with the output-side engaging portion, the rotational torque input to the input member is transmitted to the output member. On the other hand, when rotational torque is reversely input to the output member, based on engagement of the output-side engaging portion with the output-side engaged portion, the engaging element moves in a direction toward the pressed surface, pressing the pressing surface against the pressed surface, frictionally engaging the pressing surface with the pressed surface.

CITATION LIST

Patent Literature

Patent Literature 1: WO 2019/026794 A1

SUMMARY OF INVENTION

Technical Problem

In the reverse-input blocking clutch disclosed in WO 2019/026794 A1, the dimensional relationships of the components are not particularly restricted other than a configuration in which a gap (gap in the first direction which is a direction of the engaging element going away from or toward the pressed surface) for allowing the engaging element to be pressed against the pressed surface based on engagement between the engaging element and the output member in a position where the engaging element is brought into contact with the pressed surface due to rotational torque reversely input to the output member.

However, in the reverse-input blocking clutch disclosed in WO 2019/026794 A1, in order to avoid excessively high shape precision of the input member and the engaging element, as well as to ensure the workability of assembly work, it is necessary to regulate the dimensions of the components so that the input member and the engaging element can be combined relatively loosely. In this case, a gap in the first direction is formed at an engagement portion between the input member and the engaging element.

In the reverse-input blocking clutch disclosed in WO 2019/026794 A1, since there is no restriction on the gap in the first direction between the input member and the engaging element, a gap in the circumferential direction is formed between the input-side engaging portion and the input-side engaged portion. As a result, due to the gap in the circumferential direction, rattling of the input member with respect to the engaging element becomes larger, and there is a possibility that an unpleasant abnormal noise will be generated due to a collision between the input member and the engaging element when releasing the locked or semi-locked state. In particular, the rattling of the input member becomes significant when the direction of the rotational torque input to the input member is reversed, making it more likely to generate the abnormal noise.

An object of the present disclosure is to achieve a structure of a reverse-input blocking clutch capable of minimizing rattling of the input member.

Solution to Problem

The reverse-input blocking clutch according to a first aspect of the present disclosure includes a pressed member, an input member, an output member, an engaging element, and a leaf spring.

The pressed member has a pressed surface around an inner peripheral surface thereof.

The input member has an input-side engaging portion arranged on an inner side in a radial direction of the pressed surface, the input member being coaxially arranged with the pressed surface.

The output member has an output-side engaging portion on the inner side in the radial direction of the pressed surface arranged further on the inner side in the radial direction than the input-side engaging portion, the output member being coaxially arranged with the pressed surface.

The engaging element has a pressing surface facing the pressed surface, an input-side engaged portion engageable with the input-side engaging portion, and an output-side engaged portion engageable with the output-side engaging portion, the engaging element being arranged so as to be movable in a first direction which is a direction of the pressing surface going away from or toward the pressed surface. Further, when rotational torque is input to the input member, the engaging element moves in a direction going away from the pressed surface with respect to the first direction based on engagement of the input-side engaging portion with the input-side engaged portion, and by engaging the output-side engaged portion with the output-side engaging portion, transmits the rotational torque input to the input member to the output member, while, when rotational torque is reversely input to the output member, based on engagement of the output-side engaging portion with the output-side engaged portion, the engaging element presses the pressing surface against the pressed surface so as to frictionally engage the pressing surface with the pressed surface.

The leaf spring has two held portions arranged on both sides of the input-side engaging portion with respect to a second direction perpendicular to a center axis of the input member and the first direction and elastically held between the input-side engaging portion and the input-side engaged portion, and a base portion connecting the two held portions.

In a reverse-input blocking clutch of one aspect of the present disclosure, the two held portions may apply elasticity to the input-side engaging portion, the elasticity having components in directions facing each other with respect to the second direction and a component facing a direction bringing the pressing surface closer to the pressed surface with respect to the first direction.

In a reverse-input blocking clutch of one aspect of the present disclosure, a biasing member may be included, the biasing member elastically biassing the engaging element in a direction bringing the pressing surface closer to the pressed surface with respect to the first direction, and a component applied from the biasing member to the engaging element in the direction bringing the pressing surface closer to the pressed surface with respect to the first direction may be made larger than a component applied from the two held portions to the engaging element in a direction moving the pressing surface away from the pressed surface with respect to the first direction.

In a reverse-input blocking clutch of one aspect of the present disclosure, the two held portions may apply elasticity to the input-side engaging portion, the elasticity having only components in directions facing each other with respect to the second direction.

In a reverse-input blocking clutch of one aspect of the present disclosure, the two held portions may apply elasticity to the input-side engaging portion, the elasticity having components in directions facing each other with respect to the second direction and a component facing a direction moving the pressing surface away from the pressed surface with respect to the first direction.

In a reverse-input blocking clutch of one aspect of the present disclosure, the leaf spring may include a restricting portion regulating relative displacement thereof in an axial direction with respect to the engaging element.

In a reverse-input blocking clutch of one aspect of the present disclosure, the restricting portion may have two bent pieces that are bent from end portions on both sides in the axial direction of the two held portions or the base portion, and are arranged on both sides in the axial direction of portions around the input-side engaged portion of the engaging element.

In a reverse-input blocking clutch of one aspect of the present disclosure, at least one location of the base portion may be brought into contact with a portion of an inner surface of the input-side engaged portion facing the inner side in the radial direction.

In a reverse-input blocking clutch of one aspect of the present disclosure, the engaging element may be configured by two engaging elements. In this case, the input-side engaging portion is configured by two input-side engaging portions.

Advantageous Effects of Invention

In a reverse-input blocking clutch according to one aspect of the present disclosure, when the input member rotates, of the two held portions of the leaf spring, a held portion arranged on a front side of the input-side engaging portion with respect to a direction of rotation of the input member is required to be elastically deformed. As a result, the input member can be prevented from rattling.

BRIEF DESCRIPTION OF DRAWINGS

FIG. 11(A) is a perspective view of a leaf spring of the reverse-input blocking clutch of the first example, FIG. 11(B) is an end view of the leaf spring when viewed from the axial direction, FIG. 11(C) is a top view thereof when viewed from the upper side of FIG. 11(B), and FIG. 11(D) is a side view thereof when viewed from a side of FIG. 11(B).

DESCRIPTION OF EMBODIMENTS

First Example

Figure 1:
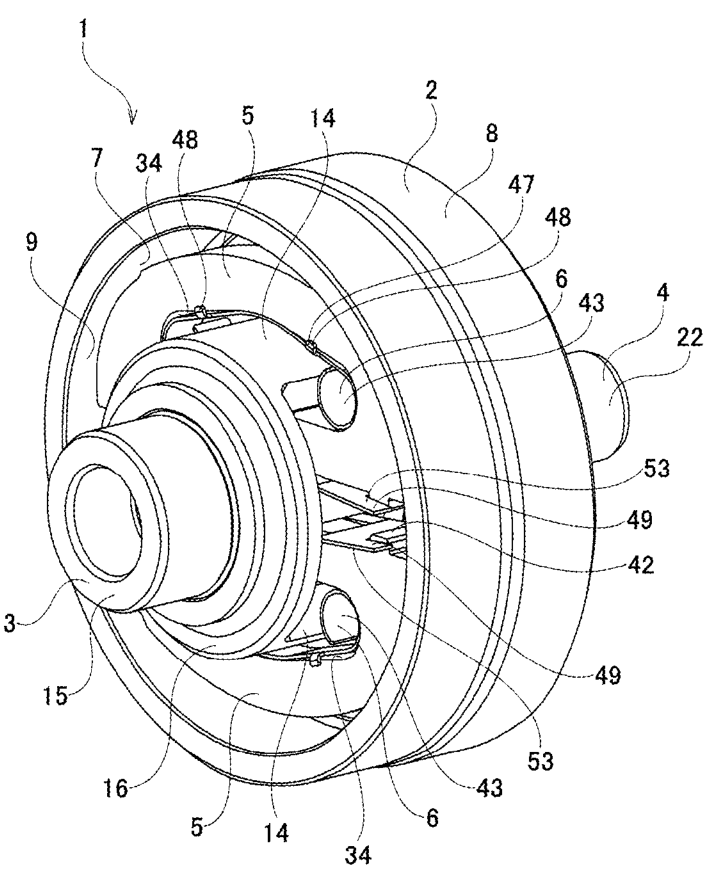
FIG. 1 is a perspective view of a reverse-input blocking clutch of a first example of an embodiment of the present disclosure.
Figure 2:
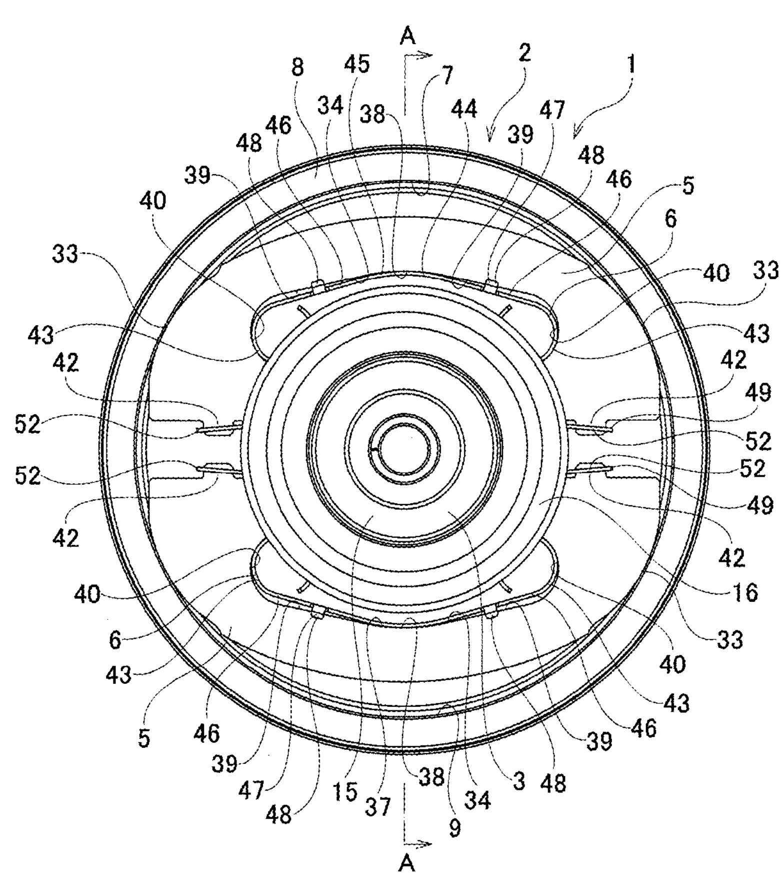
FIG. 2 is an end view of the reverse-input blocking clutch of the first example, when viewed from the input member side with respect to the axial direction.
Figure 3:
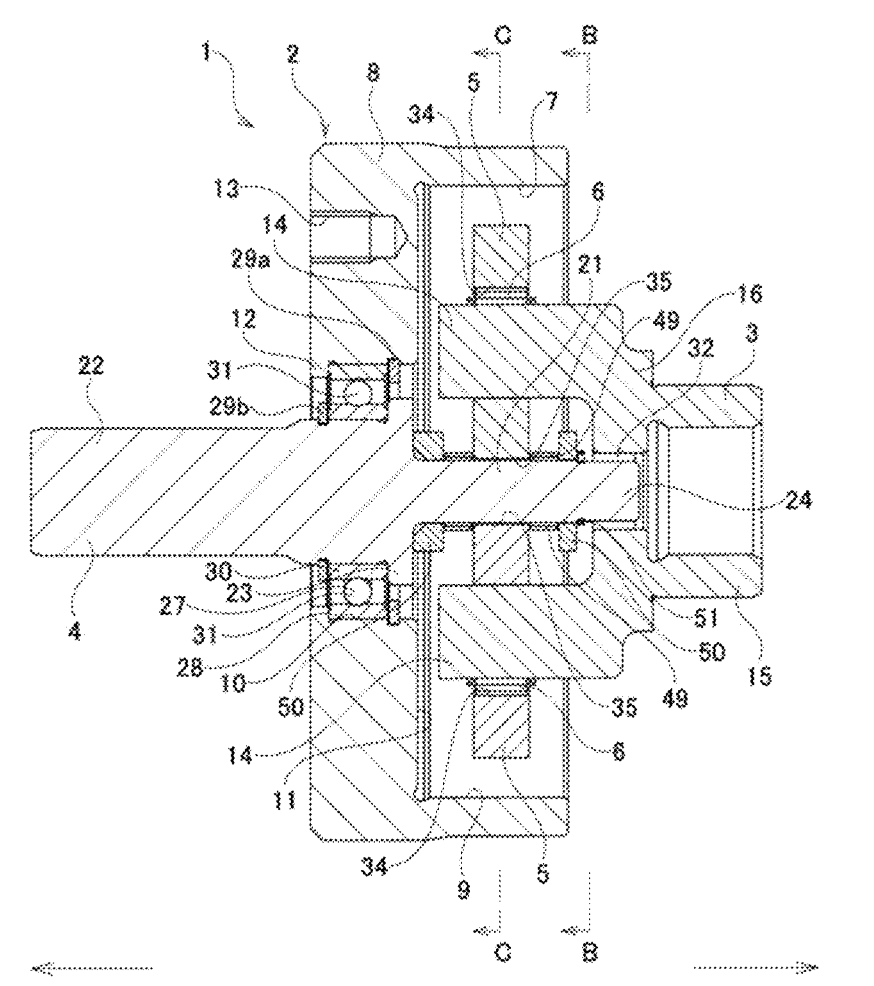
FIG. 3 is a cross-sectional view of section A-A in FIG. 2.
Figure 4:
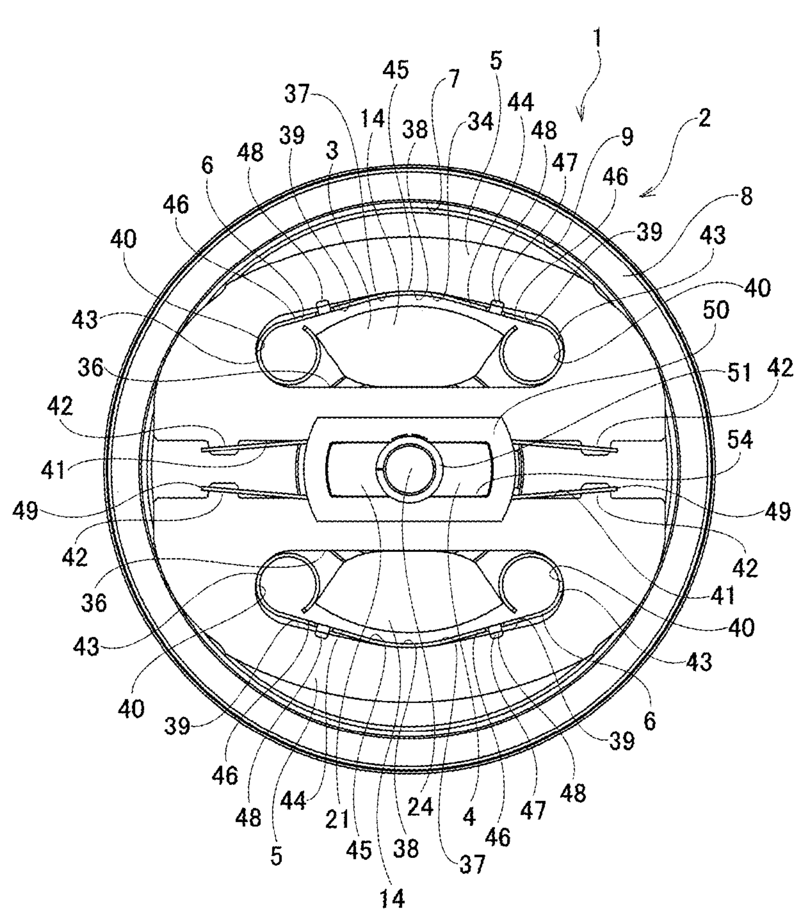
FIG. 4 is a cross-sectional view of section B-B in FIG. 3.

A first example of an embodiment of the present disclosure will be described using FIG. 1 to FIG. 11(D). Here, the axial direction, the radial direction, and the circumferential direction refer to, unless stated otherwise, the axial direction, the radial direction, and the circumferential direction of a reverse-input blocking clutch 1. In this example, the axial direction, the radial direction, and the circumferential direction of the reverse-input blocking clutch 1 coincides with the axial direction, the radial direction, and the circumferential direction of an input member 3 and coincides with the axial direction, the radial direction, and the circumferential direction of an output member 4. Further, one side in the axial direction is the input member 3 side (right side in FIG. 3) and the other side in the axial direction is the output member 4 side (left side in FIG. 3).

<Construction of Reverse-Input Blocking Clutch>

The reverse-input blocking clutch 1 of this example includes a pressed member 2, an input member 3, an output member 4, an engaging element 5, and a leaf spring 6. The reverse-input blocking clutch 1 has a reverse input blocking function that transmits rotational torque input to the input member 3 to the output member 4; however, completely blocks rotational torque reversely input to the output member 4 and does not transmit the rotational torque to the input member 3, or transmits a part of the rotational torque to the input member 3 and blocks the remaining part.

The pressed member 2 has a pressed surface 7 on an inner peripheral surface thereof. An input-side engaging portion 14 of the input member 3 and an output-side engaging portion 21 of the output member 4 are arranged coaxially on the inner side in the radial direction of the pressed surface 7, and the engaging element 5 is arranged so as to be movable in a direction going away from or toward the pressed surface 7. The input-side engaging portion 14, the output-side engaging portion 21, and the engaging element 5 are rotatable on the inner side in the radial direction of the pressed surface 7. Further, the pressed surface 7 configures a surface that comes into contact with a pressing surface 33 of the engaging element 5 when the engaging element 5 moves in a direction going toward the pressed surface 7.

In this example, the pressed surface 7 has an annular shape when viewed from the axial direction, and although it is not limited to this, but the pressed surface 7 has a cylindrical shape in this example whose inner diameter does not change in the axial direction.

In this example, the pressed member 2 is supported and fixed to a fixed portion such as a housing that does not rotate even during use, and its rotation is restricted. Alternatively, the pressed member 2 is configured by the fixed portion. The shape of the pressed member 2 is not particularly limited as long as it has a pressed surface 7 on the inner peripheral surface thereof.

In this example, the pressed member 2 includes an output-side element 8 and an input-side element (not illustrated).

The output-side element 8 has an inner peripheral surface having a stepped cylindrical shape. In other words, the inner peripheral surface of the output-side element 8 is configured by connecting a large diameter cylindrical surface portion 9 on the one side in the axial direction and a small diameter cylindrical surface portion 10 on the other side in the axial direction by a connecting surface portion 11 facing the one side in the axial direction. In this example, the large diameter cylindrical surface portion 9 configures the pressed surface 7. Further, the output-side element 8 has an inward flange portion 12 that protrudes toward the inner side in the radial direction at an end portion on the other side in the axial direction of the small diameter cylindrical surface portion 10.

The pressed member 2 is configured by fitting (spigot fitting) the input-side element with the output-side element 8 without looseness, so as to position the output-side element 8 and the input-side element in the radial direction, and, in this state, coupling the output-side element 8 and the input-side element by a coupling member such as a bolt. The pressed member 2 is supported and fixed to the fixed portion by screwing a bolt inserted into a through hole provided in the fixed portion into a screw hole 13 that is open on a side surface on the other side in the axial direction of the output-side element 8.

The input member 3 has an input-side engaging portion 14 arranged on the inner side in the radial direction of the pressed surface 7, and the input member 3 is coaxially arranged with the pressed surface 7. The input member 3 is configured so as to be connected to an input-side mechanism such as an electric motor, to receive rotational torque, and to be rotatable on the inner side in the radial direction of the pressed surface 7 due to the input of the rotational torque. The input-side engaging portion 14 is provided at a portion that is shifted on the outer side in the radial direction from the center of rotation O of the input member 3, and has a portion that engages with an input-side engaged portions 34 of the engaging element 5. The input-side engaging portion 14 is configured so as to bring an inner side surface 17 in the radial direction thereof into engagement (contact) with an inside surface 36 in the radial direction of the input-side engaged portion 34 as the input member 3 or the engaging element 5 rotates.

In this example, the input member 3 has, in addition to the input-side engaging portion 14, an input shaft portion 15, and an input flange portion 16.

The input shaft portion 15 has a cylindrical shape.

The input flange portion 16 protrudes from an outer circumferential surface of an end portion on the other side in the axial direction of the input shaft portion 15 toward the outer side in the radial direction around the entire circumference.

The input-side engaging portion 14 protrudes from a portion of a side surface on the other side in the axial direction of the input flange portion 16, that is shifted from the center of rotation O, toward the other side in the axial direction.

The shape of the input-side engaging portion 14 is not particularly limited as long as it is configured to engage with the input-side engaged portion 34 of the engaging element 5. Further, the number of the input-side engaging portion 14 is determined in accordance with the number of the engaging element 5, and when the engaging element 5 is configured by a plurality of engaging elements 5, the input side engaging portion 14 is also configured by a plurality of input-side engaging portions 14 accordingly.

In the reverse-input blocking clutch 1 of this example, the engaging element 5 is configured by two engaging elements 5. Therefore, in accordance with the number of the engaging element 5, the input-side engaging portion 14 is configured by two input side engaging portions 14. The two input-side engaging portions 14 are arranged at two locations on opposing sides in the radial direction of the side surface on the other side in the axial direction of the input flange portion 16, and are separated from each other with respect to the radial direction of the input member 3. Further, the input-side engaging portions 14 are formed symmetrically to each other with respect to the circumferential direction.

In this example, each input-side engaging portion 14 has an end surface shape of a substantially fan-shape or a substantially trapezoidal shape having a width in the circumferential direction that becomes larger as going toward the outer side in the radial direction when viewed from the axial direction. An inner side surface 17 in the radial direction of each input-side engaging portion 14 is configured by a flat surface, so that the flat surfaces of the input-side engaging portions 14 are parallel to each other, and an outer side surface 18 in the radial direction of each input-side engaging portion 14 has a cylindrical contour shape that is the same as the outer circumferential surface of the input flange portion 16. Two side surfaces 19 in the circumferential direction of each input-side engaging portion 14 are configured by flat surfaces that are inclined in a direction going away from each other as going toward the outer side in the radial direction. The inner side surface 17 in the radial direction and the side surfaces 19 in the circumferential direction are connected by curved surface portions 20 respectively having a substantially arc-shaped contour shape when viewed from the axial direction.

The input member 3 can be rotatably supported by the pressed member 2 or the fixed portion. In this example, the input member 3 is rotatably supported by a radial bearing on the inner side of the input-side element.

The output member 4 has the output-side engaging portion 21 on the inner side in the radial direction of the pressed surface 7, the output-side engaging portion 21 is arranged further on the inner side in the radial direction than the input-side engaging portion 14, and the output member 4 is coaxially arranged with the pressed surface 7. In other words, the output member 4 is also being coaxially arranged with the input member 3. The output member 4 is connected to an output-side mechanism such as a speed-reducing mechanism or the like, and is configured so as to output rotational torque to the output-side mechanism as it rotates.

The output side engaging portion 21 has a portion that is further on the inner side in the radial direction than the input-side engaging portion 14 but is shifted on the outer side in the radial direction from the center of rotation O of the output member 4, and the portion is arranged at a location engageable with an output-side engaged portion 35 of the engaging element 5. The output-side engaging portion 21 is configured so that the portion engages with the output-side engaged portion 35 as the output member 4 or the engaging element 5 rotates.

In this example, the output member 4 has, in addition to the output-side engaging portion 21, an output shaft portion 22, an output flange portion 23, and a small diameter shaft portion 24.

The output shaft portion 22 has a stepped columnar shape.

The output flange portion 23 protrudes from the outer circumferential surface of an end portion on the one side in the axial direction of the output shaft portion 22 toward the outer side in the radial direction around the entire circumference.

The output-side engaging portion 21 protrudes from a central section of the side surface on the one side in the axial direction of the output shaft portion 22 toward the one side in the axial direction.

The shape of the output-side engaging portion 21 is not particularly limited as long as it is configured to have the portion that engages with the output-side engaged portion 35. Further, the number of the portion of the output-side engaging portion 21 that engages with the output-side engaged portion is determined in accordance with the number of the engaging element 5, and when the engaging element 5 is configured by a plurality of engaging elements 5, the output-side engaging portion 21 is configured to have a plurality of portions that engage with the output-side engaged portions. Here, even when the engaging element is configured by one engaging element, the output-side engaging portion can be provided with a plurality of portions that engage with the output-side engaged portions.

In this example, the output-side engaging portion 21 is configured to have portions that engage with the two output-side engaged portions 35 in accordance with the number of the engaging elements 5.

In this example, the output-side engaging portion 21 has an end surface shape that is substantially rectangular or substantially oblong when viewed from the axial direction, and protrudes from the central section of the end surface on the one side in the axial direction of the output shaft portion 22 toward the one side in the axial direction. In other words, the distance from the center of rotation O of the output member 4 to the outer circumferential surface of the output-side engaging portion 21 which is a portion that engages with the output side engaged portion 35 is not constant in the circumferential direction. Due to this, the output-side engaging portion 21 has a cam function.

More specifically, the outer circumferential surface of the output-side engaging portion 21 is configured by two flat surfaces 25 that are parallel to each other and two convex curved surfaces 26 each of which is partially cylindrical. Therefore, the distance from the center of rotation O of the output member 4 to the outer circumferential surface of the output-side engaging portion 21 is not constant over the circumferential direction. Each of the two convex curved surfaces 26 is configured by a partial cylindrical surface centered about the center of rotation O of the output member 4.

The output-side engaging portion 21 is plane-symmetrical to a virtual plane that passes through the center of rotation O of the output member 4 and is perpendicular to the flat surfaces 25. Furthermore, the output-side engaging portion 21 is plane-symmetrical to a virtual plane that passes through the center of rotation O of the output member 4 and is parallel to the flat surfaces 25.

The output-side engaging portion 21 is arranged in a portion between the two input-side engaging portions 14.

The small diameter shaft portion 24 has a columnar shape, and protrudes from a central section of an end surface on the one side in the axial direction of the output-side engaging portion 21 toward the one side in the axial direction.

The output member 4 can be rotatably supported by the pressed member 2 or the fixed portion. In this example, the output member 4 is rotatably supported by a radial rolling bearing 27 on the inner side in the radial direction of the output-side element 8 of the pressed member 2. An outer ring 28 of the radial rolling bearing 27 is fitted inside the small diameter cylindrical surface portion 10 of the output-side element 8 without looseness, and is held in the axial direction between a side surface on the one side in the axial direction of the inward flange portion 12 and a retaining ring 29*a* that is locked at an end portion on the one side in the axial direction of the small diameter cylindrical surface portion 10. The inner ring 30 of the radial rolling bearing 27 is fitted around an end portion on the one side in the axial direction of the output shaft portion 22 without looseness, and is held in the axial direction between a side surface on the other side in the axial direction of the output flange portion 23 and a retaining ring 29*b* that is locked on an outer circumferential surface of a middle section in the axial direction of the output shaft portion 22.

In the illustrated example, the radial rolling bearing 27 is configured by a ball bearing using balls as rolling bodies 31. However, the radial rolling bearing for supporting the output member 4 can also be configured by a tapered roller bearing using tapered rollers as rolling bodies or a roller bearing using cylindrical rollers as rolling bodies.

Further, the small diameter shaft portion 24 of the output member 4 is supported by a sliding bearing (sleeve) 32 inside the input member 3 so as to be rotatable relative to the input member 3.

The engaging element 5 has a pressing surfaces 33 facing the pressed surface 7, an input-side engaged portion 34 engageable with the input-side engaging portion 14, and an output-side engaged portion 35 engageable with the output-side engaging portion 21, and is arranged so as to be movable in a first direction which is a direction going away from or toward the pressed surface 7.

When rotational torque is input to the input member 3, the engaging element 5 moves in a direction going away from the pressed surface 7 with respect to the first direction based on engagement of the input-side engaging portion 14 with the input-side engaged portion 34, and by engaging the output-side engaged portion 35 with the output-side engaging portion 21, transmits the rotational torque input to the input member 3 to the output member 4, while, when rotational torque is reversely input to the output member 4, based on engagement of the output-side engaging portions 21 with the output-side engaged portion 35, the engaging element 5 presses the pressing surface 33 against the pressed surface 7 so as to frictionally engage the pressing surface 33 with the pressed surface 7.

The engaging element 5 can be configured by one engaging element 5 having the above structure, and can be also configured by two or more engaging elements 5.

In this example, the engaging element 5 is configured by two engaging elements 5. Each of the engaging elements 5 has a function as an engaging element 5. Each of the engaging elements 5 has an end surface shape having a substantially semicircular shape when viewed from the axial direction, and has a symmetric shape with respect to the width direction (the direction indicated by the arrow B in FIG. 5). In the following, the configuration of each of the engaging elements 5 will be explained.

Figure 5:
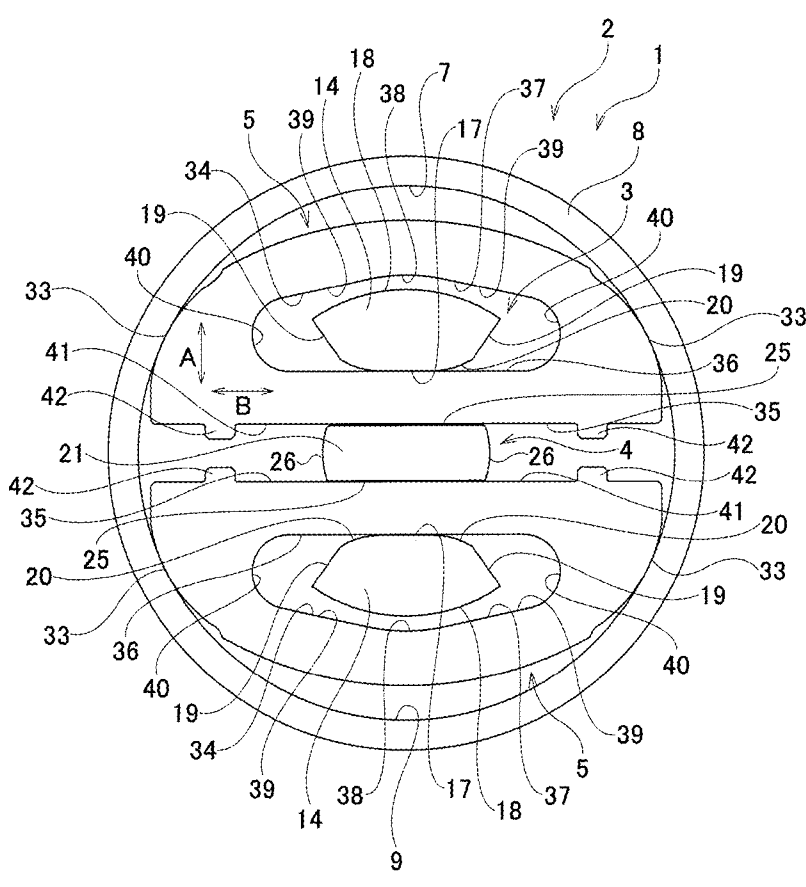
FIG. 5 is a cross-sectional view of section C-C in FIG. 3, with a leaf spring and a biasing member omitted.

In this example, the radial direction with respect to the engaging element 5 is a direction of the pressing surfaces 33 going away from or toward the pressed surface 7, and it corresponds to the direction indicated by the arrow A in FIG. 5. The width direction with respect to the engaging element 5 is a direction perpendicular to both the direction of the pressing surfaces 33 going away from or toward the pressed surface 7 and the axal direction of the input member 3, and corresponds to the direction indicated by the arrow B in FIG. 5. In this example, the radial direction with respect to the engaging element 5 corresponds to the first direction, and the width direction with respect to the engaging element 5 corresponds to the second direction.

The pressing surface 33 is provided on an outside surface in the radial direction of the engaging element 5 facing the pressed surface 7. In this example, the pressing surface 33 is configured by two pressing surfaces 33 provided at two locations on the outside surface in the radial direction of the engaging element 5 that are separated from each other in the circumferential direction. Each of the pressing surfaces 33 is configured by a partially cylindrical convex curved surface having a radius of curvature smaller than the radius of curvature of the pressed surface 7.

A portion of the outside surface in the radial direction of the engaging element 5 that is shifted in the circumferential direction from the two pressing surfaces 33 exists further on the inner side in the radial direction than a virtual circle that is centered around the center axis O of the input member 3 and is in contact with the two pressing surfaces 33 when viewed from the axial direction. In other words, when the two pressing surfaces 33 are in contact with the pressed surface 7, the portion that is shifted in the circumferential direction from the two pressing surfaces 33 does not come into contact with the pressed surface 7.

It is preferable that the pressing surface 33 has a surface property that has a larger coefficient of friction with the pressed surface 7 than the other portion of the engaging element 5. Further, the pressing surface 33 may be configured to be integral with the other portion of the engaging element 5, or may be configured by a surface of a friction material fixed to the other portion of the engaging element 5 by, for example, sticking or bonding.

In this example, the input-side engaged portion 34 is provided at an intermediate portion in the radial direction of the central portion in the width direction of the engaging element 5. More specifically, although it is not limited to the following, the input-side engaged portion 34 has an opening shape of a substantially circular segment when viewed from the axial direction, and is configured by a through hole that passes through in the axial direction at the intermediate portion in the radial direction of the central portion in the width direction.

The input-side engaged portion 34 has a size that allows the input-side engaging portion 14 to be loosely inserted therein. Therefore, in a state where the input-side engaging portion 14 is inserted inside the input-side engaged portion 34, a gap exist respectively in the width direction and in the radial direction of the engaging element 5 between the input-side engaging portion 14 and the inner surface of the input-side engaged portion 34. As a result, the input-side engaging portion 14 is capable of displacement in the direction of rotation of the input member 3 relative to the input-side engaged portion 34, and the input-side engaged portion 34 is capable of displacement in the radial direction of the engaging element 5 relative to the input-side engaging portion 14.

The shape of the input-side engaged portion 34 is not particularly limited as long as engageable with the input-side engaging portion 14.

In this example, of the inner surface of the input-side engaged portion 34, an inside surface 36 in the radial direction facing the outer side in the radial direction is configured by a flat surface perpendicular to the first direction. Further, of the inner surface of the input-side engaged portion 34, an outside surface 37 in the radial direction facing the inner side in the radial direction is configured by a composite surface having a substantially V shape when viewed from the axial direction. Specifically, the outside surface 37 in the radial direction has a concave curved surface portion 38 having a partially cylindrical shape at the intermediate portion in the width direction of the engaging element 5, and has two inclined surface portions 39 at both side portions in the width direction of the engaging element 5 that are inclined in directions going toward the inside in the radial direction of the engaging element 5 as separated from each other in the width direction of the engaging element 5. Side surfaces 40 in the circumferential direction that connect end portions on both sides in the second direction of the inside surface 36 in the radial direction and end portions on both sides in the second direction of the outside surface 37 in the radial direction are configured by partially cylindrical concave curved surfaces.

In this example, the output-side engaged portion 35 is provided at a central portion in the width direction of the inside surface in the radial direction of the engaging element 5. The shape of the output-side engaged portion 35 is not particularly limited as long as it is configured so as to be engageable with the output-side engaging portion 21.

In this example, the engaging element 5 has a flat surface portion 41 perpendicular to the radial direction of the engaging element 5 on the inside surface in the radial direction thereof, and has two convex portions 42 protruding toward the inner side in the radial direction at two locations of the flat surface portion 41 in the width direction of the engaging element 5. Further, the output-side engaged portion 35 is configured by a portion of the flat surface portion 41 existing between the two convex portions 42 with respect to the width direction. In this example, the dimension in the width direction of the output-side engaged portion 35, in other words, the distance between the two convex portions 42 is larger than the dimension in the width direction of the flat surface 25 of the output-side engaging portion 21.

In the reverse-input blocking clutch 1 of this example, in a state where the pressing surfaces 33 of the two engaging elements 5 are oriented in opposite directions with respect to the radial direction and the flat surface portions 41 are faced to each other, each of the engaging elements 5 is arranged on the inner side in the radial direction of the pressed member 2 so as to be movable in the first direction, which corresponds to the radial direction of each of the engaging elements 5 and the direction of the pressing surfaces 33 going away from or toward the pressed surface 7. Further, the two input-side engaging portions 14 of the input member 3 arranged on the one side in the axial direction are respectively inserted in the axial direction through the input-side engaged portions 34 of the two engaging elements 5, and the output-side engaging portion 21 of the output member 4 arranged on the other side in the axial direction is inserted in the axial direction between the two output-side engaged portions 35 of the engaging elements 5. In other words, the two engaging elements 5 are arranged so that the output-side engaging portion 21 is held by the output-side engaged portions 35 from the outer side in the radial direction.

The inner-diameter dimension of the pressed member 2 and the radial dimension of the engaging elements 5 are regulated so that a gap exists at least in one of a portion between the pressed surface 7 and the two pressing surfaces 33, or a portion between tip end surfaces of two combinations of the convex portions 42 configured by the two convex portions 42 of the two engaging elements facing each other, in a state where the two engaging elements 5 are arranged on the inner side in the radial direction of the pressed member 2.

The leaf spring 6 is arranged on both sides of the input-side engaging portion 14 with respect to the second direction, and has two held portions 43 that are elastically held between the input-side engaging portion 14 and the input-side engaged portion 34 and a base portion 44 that connects the two held portions 43.

The two held portions 43 apply elasticity having components in directions facing each other with respect to the second direction and a component facing the outer side with respect to the radial direction of the engaging element 5 to the input-side engaging portion 14. Further, the two held portions 43 apply elasticity having components in directions going away from each other with respect to the second direction and a component facing the inner side with respect to the radial direction of the engaging element 5 to the engaging element 5.

In this example, each of the held portions 43 has a discontinuous portion at one location in the circumferential direction thereof, and has a partially cylindrical shape having a radius of curvature of its outer circumferential surface being slightly smaller than that of the side surfaces 40 in the circumferential direction of the input-side engaged portion 34. Although it is not limited to the following, but in the illustrated example, each of the held portions 43 has an end surface shape that is substantially a ¾ arc shape when viewed from the axial direction.

The base portion 44 is arranged between the outside surface 18 in the radial direction of the input-side engaging portion 14 and the outside surface 37 in the radial direction of the input-side engaged portion 34, and connects base end portions of the two held portions 43, in other words, connects the end portions of the end portions on both sides in the circumferential direction of the two held portions 43 that are on the sides farther from each other in the second direction.

In this example, the base portion 44 has an end surface shape having a substantially V shape when viewed from the axial direction. Specifically, the base portion 44 has a curved portion 45 with a partially cylindrical shape in the intermediate portion with respect to the second direction, and has two inclined plate portions 46 on both side portions with respect to the second direction that are inclined in directions going away from the pressed surface 7 with respect to the first direction as going away from each other in the second direction.

The leaf spring 6 is arranged inside the input-side engaged portion 34 with the base portion 44 elastically deformed so as to bring the two held portions 43 closer to each other, and each of the held portions 43 is held between the side surface 19 in the circumferential direction of the input-side engaging portion 14 and the side surface 40 in the circumferential direction of the input-side engaged portion 34 in an elastically compressed (reduced diameter) state. As a result, as each of the held portions 43 attempts to elastically restore its shape so as to expand in diameter, the outer circumferential surfaces near the tip end portions of the held portions 43 are elastically pressed against the side surfaces 19 in the circumferential direction of the input-side engaging portion 14.

Further, as the base portion 44 attempts to elastically restore its shape in a direction bringing the two held portions 43 away from each other and each of the held portions 43 attempts to elastically restore its shape so as to expand in diameter, of the outer circumferential surface of each of the held portions 43, a portion that is located on the substantially opposite side of the portion that is in contact with the side surface 19 in the circumferential direction with respect to the radial direction of the held portion 43 is elastically pressed against the side surface 40 in the circumferential direction of the input-side engaged portion 34.

In a state where the leaf spring 6 is arranged inside the input-side engaged portion 34, at least one location of the outside surface in the radial direction of the base portion 44 is brought into contact with the outside surface 37 in the radial direction of the input-side engaged portion 34 facing toward the inner side in the radial direction. In this example, the outside surface in the radial direction of the curved portion 45 is in contact with the concave curved surface portion 38 of the outside surface 37 in the radial direction of the input-side engaged portion 34.

In this example, the leaf spring 6 has a symmetric shape with respect to the second direction. Therefore, the spring characteristics of the two held portions 43 are the same as each other. Further, the width dimension with respect to the axial direction of the two held portions 43 and the width dimension with respect to the axial direction of the base portion 44 are the same as each other. Furthermore, the width dimension with respect to the axial direction of the two held portions 43 and the width dimension with respect to the axial direction of the base portion 44 are approximately the same as the thickness in the axal direction of the engaging element 5.

However, the width dimension with respect to the axial direction of the two held portions and the width dimension with respect to the axial direction of the base portion can also be made smaller or larger than the thickness in the axal direction of the engaging element. Further, it is also possible that the width dimension with respect to the axial direction of the two held portions and the width dimension with respect to the axial direction of the base portion are made different from each other.

The leaf spring 6 further has a restricting portion 47 that regulates relative displacement in the axial direction with respect to the engaging element 5.

The restricting portion 47 has bent pieces 48 which are bent from end portions on both sides in the axial direction of the two held portions 43 or the base portion 44 and arranged on both side portions in the axial direction of portions around the input-side engaged portion 34 of the engaging element 5.

In this example, the restricting portion 47 has four bent pieces 48 which are bent from end portions on both sides in the axial direction of the inclined plate portions 46 of the base portion 44 toward the outer side in the radial direction of the engaging element 5 and arranged on both sides in the axial direction of portions located on the outer side in the radial direction of the inclined surface portions 39 of the engaging element 5. In other words, by holding portions located on the outer side in the radial direction of the inclined surface portions 39 of the engaging element 5 by the bent pieces 48 from both sides in the axial direction, relative displacement in the axial direction of the leaf spring 6 with respect to the engaging element 5 is regulated.

The leaf spring 6 is integrally formed by applying punching process or bending process to a metal plate having elasticity such as a steel plate using a press.

The reverse-input blocking clutch 1 of this example further includes a biasing member 49, two spacers 50, and a stopper member 51 as optional components.

The biasing member 49 is provided between the output-side engaging portion 21 of the output member 4 and the engaging element 5, and elastically biases the engaging element 5 in directions bringing the pressing surface 33 closer to the pressed surface 7 with respect to the first direction. In this example, the biasing member 49 is configured by two biasing members 49 that are respectively arranged between the inside surfaces in the radial direction of the two engaging elements 5 and the output-side engaging portion 21 of the output member 4.

Each of the biasing members 49 is configured by a leaf spring having two arm portions 52 and two connecting portions 53. Each of the arm portions 52 has a notch that is open at a tip end portion thereof, and has a substantially U-shaped planar shape when viewed from a plate thickness direction (the radial direction of the engaging element 5). Each of the connecting portions 53 is configured by a rectangular flat plate that connects the end portions on both sides in the axial direction of the base end portions of the two arm portions 52.

Each of the biasing members 49 is supported by the engaging element 5 by engaging the notches formed in the two arm portions 52 with the two convex portions 42 of the engaging element 5. In this example, regardless of the positional relation between each of the engaging elements 5 and the output-side engaging portion 21, specifically, the position in the radial direction of each of the engaging elements 5 and the rotational phase of the output-side engaging portion 21 relative to each of the engaging elements 5, the output-side engaging portion 21 is elastically brought into contact with the two connecting portions 53 of each of the biasing members 49. Accordingly, looseness between the output-side engaging portion 21 and the output-side engaged portion 35 is suppressed.

The shape of the biasing member is not particularly limited as long as it is possible to promptly switch the locked state or semi-locked state when rotational torque is reversely input to the output member by elastically biasing the engaging element in a direction bringing the pressing surface closer to the pressed surface. For example, the biasing member may be configured by a torsion coil held in an elastically compressed state between the inside surfaces in the radial direction of the two engaging elements.

Each of the spacers 50 is configured in a flat plate shape, and has a substantially oblong or a substantially rectangular end surface shape when viewed from the axial direction. Each of the spacers 50 has a through hole 54 through which the output-side engaging portion 21 can be inserted without looseness. The spacers 50 are arranged on both sides in the axial direction of the two engaging elements 5 with the output-side engaging portion 21 inserted into each of the through holes 54 without looseness.

The stopper member 51 is configured by a retaining ring having a partially cylindrical shape. In other words, the stopper member 51 has a substantially C-shaped end surface shape when viewed from the axial direction.

The stopper member 51 is locked to the end portion on the other side in the axial direction of the small diameter shaft portion 24. Accordingly, of the two spacers 50, the spacer 50 on the one side in the axial direction is prevented from being displaced toward the one side in the axial direction. In this example, the biasing members 49 supported by the two engaging elements 5 are held in the axial direction between the side surfaces on the one side in the axial direction of the output flange portion 23 and the stopper member 51 through the two spacers 50, thereby preventing relative displacement of the two engaging elements 5 in the axial direction with respect to the output member 4.

<Explanation of Operation of Reverse-Input Blocking Clutch>

Figure 6:
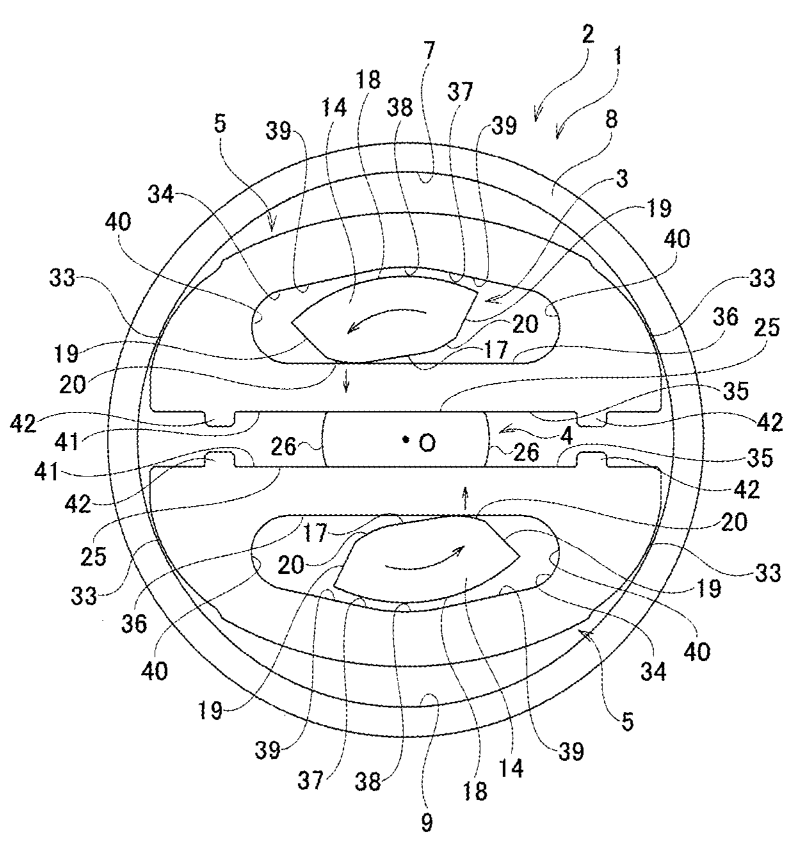
FIG. 6 is a drawing similar to FIG. 5, illustrating a state in which rotational torque is input to the input member.
Figure 7:
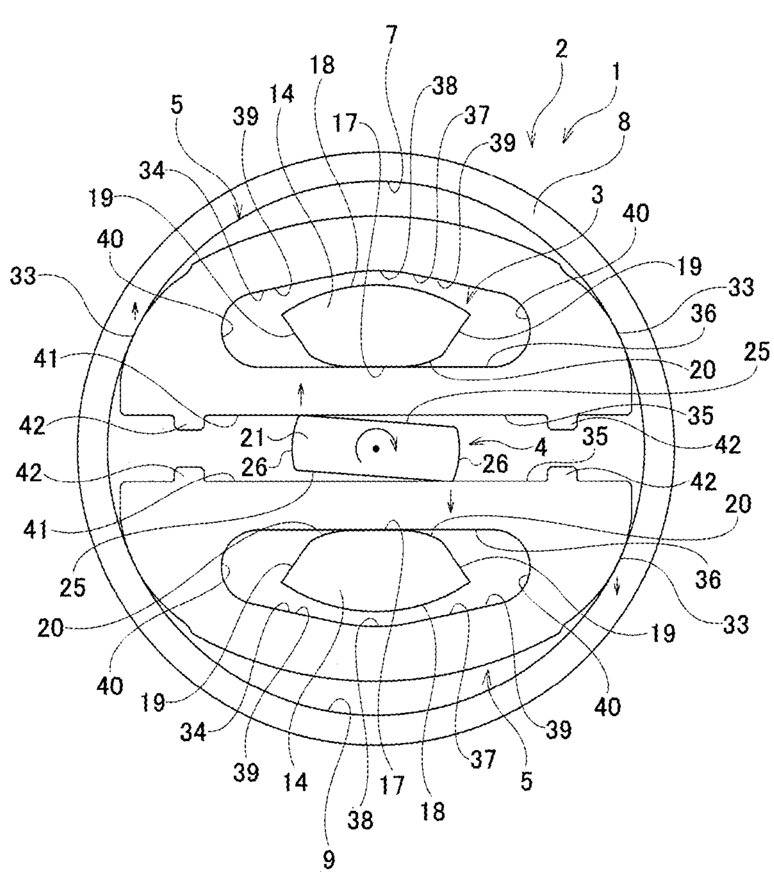
FIG. 7 is a drawing similar to FIG. 5, illustrating a state in which rotational torque is reversely input to the output member.
Figure 8:
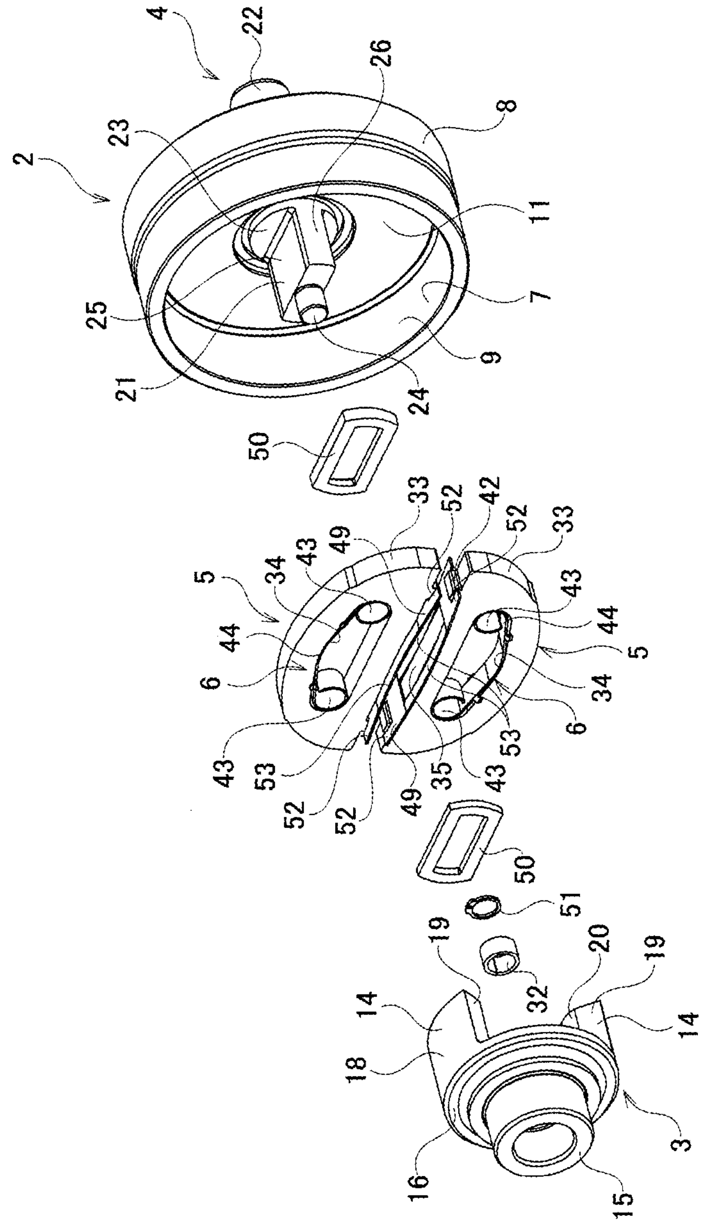
FIG. 8 is an exploded perspective view of the reverse-input blocking clutch of the first example.
Figure 9:
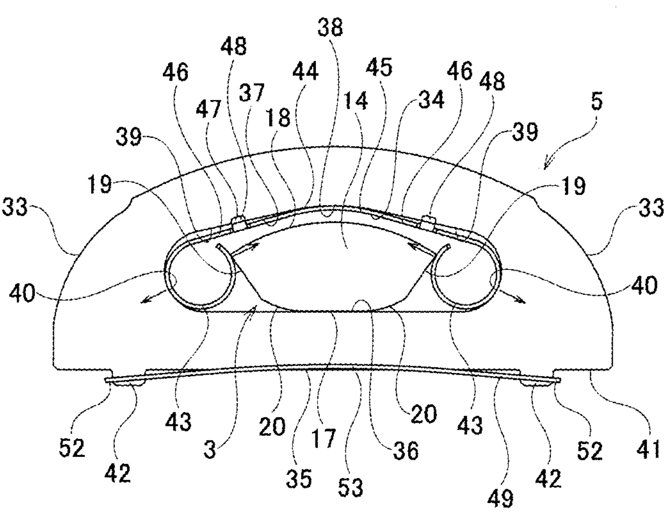
FIG. 9 is an end view of an engaging element, a leaf spring, and a biasing member of the reverse-input blocking clutch of the first example, when viewed from the axial direction.
Figure 10:
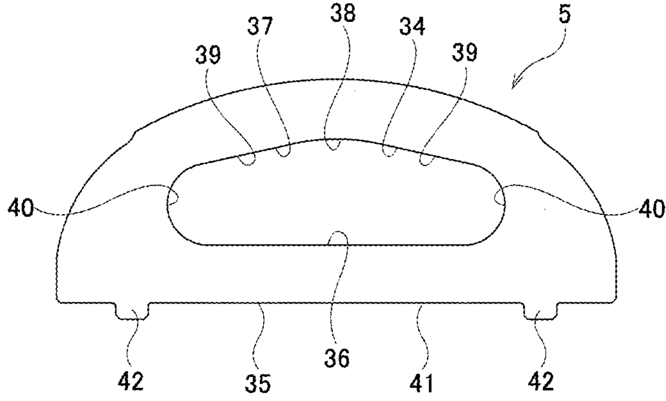
FIG. 10 is an end view of an engaging element of the reverse-input blocking clutch of the first example, when viewed from the axial direction.

Operation of the reverse-input blocking clutch 1 of this example will be explained with reference to FIG. 6 and FIG. 7. FIG. 6 and FIG. 7 omit the leaf springs 6 and the biasing members 49, and exaggerate the gaps with respect to the radial direction between the input member 3 and the two engaging elements 5 and between the output member 4 and the two engaging elements 5.

When rotational torque is input to the input member 3, the two engaging elements 5 move in directions going away from the pressed surface 7 regardless of the direction of rotation of the input member 3. More specifically, as illustrated in FIG. 6, of the two held portions 43 arranged on both sides of the input-side engaging portion 14 with respect to the second direction, the held portion 43 arranged on the front side of the input-side engaging portion 14 with respect to the direction of rotation of the input member 3 applies resistance force to the input-side engaging portion 14, and the input-side engaging portion 14 rotates against the resistance force in the direction of rotation of the input member 3 (counterclockwise in the example of FIG. 6) inside the input-side engaged portions 34 while elastically compressing the held portion 43 arranged on the front side of the input-side engaging portion 14.

Accordingly, the gap between the inner side surfaces 17 in the radial direction of the input-side engaging portion 14 and the inside surface 36 in the radial direction of the input-side engaged portion 34 is reduced, and the inner side surface 17 in the radial direction of the input-side engaging portion 14 is brought into contact with the inside surface 36 in the radial direction of the input-side engaged portion 34.

When the input member 3 further rotates from this state, the inside surface 36 in the radial direction of the input-side engaged portion 34 is pressed toward the inner side in the radial direction by the inner side surface 17 in the radial direction of the input-side engaging portion 14, and the engaging element 5 moves in a direction going away from the pressed surface 7. In other words, the two engaging elements 5 move toward the inner side in the radial direction, which is directions going toward each other, based on engagement with the input member 3 so that the inside surfaces in the radial direction of the two engaging elements 5 come closer to each other, and the output-side engaging portion 21 of the output member 4 is held from both sides in the radial direction by the output-side engaged portions 35 of the two engaging elements 5.

In this way, while rotating the output member 4 so that the flat surface 25 of the output-side engaging portion 21 is parallel to the flat surface portion 41 of the engaging element 5, the output-side engaging portion 21 and the output-side engaged portion 35 of the engaging element 5 are engaged without looseness. As a result, rotational torque that is input to the input member 3 is transmitted to the output member 4 through the two engaging elements 5, and is output from the output member 4.

When rotational torque is reversely input to the output member 4, the two engaging elements 5 move in directions going closer to the pressed surface 7 regardless of the direction of rotation of the output member 4. More specifically, as illustrated in FIG. 7, the output-side engaging portion 21 rotates inside the two output-side engaged portions 35 of the engaging elements 5 in the direction of rotation of the output member 4 (clockwise in the example of FIG. 7). Of the outer circumferential surface of the output-side engaging portion 21, the connecting portions (corner portions) between the flat surfaces 25 and the convex curved surfaces 26 press the output-side engaged portions 35 toward the outer side in the radial direction so that the two engaging elements 5 move in directions going closer to the pressed surface 7.

In other words, the two engaging elements 5 move toward the outer side in the radial direction, which is directions going away from each other, based on engagement with the output member 4, and the pressing surfaces 33 of the two engaging elements 5 come into contact with the pressed surface 7 so as to frictionally engage with the pressed surface 7.

As a result, the rotational torque that is reversely input to the output member 4 is completely blocked and not transmitted to the input member 3, or only a part of the rotational torque that is reversely input to the output member 4 is transmitted to the input member 3 and the remaining part is blocked.

In order that rotational torque that is reversely input to the output member 4 is completely blocked so as not to be transmitted to the input member 3, the output member 4 is locked by wedging (holding) the engaging element 5 between the output-side engaging portion 21 and the pressed member 2 so that the pressing surface 33 of the engaging element 5 does not slide with respect to (rotate relative to) the pressed surface 7.

In order that only a part of rotational torque that is reversely input to the output member 4 is transmitted to the input member 3 and the remaining portion is blocked, the output member 4 is semi-locked by wedging (holding) the engaging element 5 between the output side engaging portion 21 and the pressed member 2 so that the pressing surface 33 slides with respect to the pressed surface 7.

In the reverse-input blocking clutch 1 of this example, the size of the gaps between the components is adjusted in order to enable the operation described above. In particular, in the positional relation where the pressing surfaces 33 of the two engaging elements 5 are in contact with the pressed surface 7, gaps are made to exist between the inner side surfaces 17 in the radial direction of the input-side engaging portions 14 and the inside surfaces 36 in the radial direction of the input-side engaged portions 34.

Accordingly, when rotational torque is reversely input to the output member 4, it is prevented that the movement of the engaging element 5 toward the outer side in the radial direction is blocked by the input-side engaging portion 14, and even after the pressing surface 33 comes into contact with the pressed surface 7, the surface pressure acting on the contact portion between the pressing surface 33 and the pressed surface 7 changes in accordance with the magnitude of the rotational torque that is reversely input to the output member 4, thereby the output member 4 can be appropriately locked or semi-locked.

With the reverse-input blocking clutch 1 of this example, due to the same reason as the reverse-input blocking clutch disclosed in WO 2019/026794 A1, the dimension in the axial direction can be shortened, and the number of parts can be suppressed.

In the reverse-input blocking clutch 1 of this example, the respective rotations of the input member 3 and the output member 4 are converted into radial movement of the engaging element 5. By converting the rotations of the input member 3 and the output member 4 into radial movement of the engaging element 5, the engaging element 5 is engaged with the output member 4 located on the inner side in the radial direction of the engaging element 5, and the engaging element 5 is pressed against the pressed member 2 located on the outer side in the radial direction of the engaging element 5.

As described above, in the reverse-input blocking clutch 1 of this example, since it is possible to switch the unlocked state where rotational torque can be transmitted from the input member 3 to the output member 4, and the locked state where rotation of the output member 4 is prevented or the semi-locked state where rotation of the output member 4 is suppressed based on the radial movement of the engaging element 5 that is controlled by the rotation of the input member 3 and/or the output member 4, the dimension in the axial direction of the reverse-input blocking clutch 1 as a whole can be shortened.

Further, the engaging element 5 has both h a function of transmitting rotational torque input to the input member 3 to the output member 4 and a function of locking or semi-locking the output member 4. As a result, the number of parts of the reverse-input blocking clutch 1 can be suppressed, and operation can be stabilized compared to a configuration where the function of transmitting rotational torque and the function of locking or semi-locking the output member are performed by separate members.

For example, when the function of transmitting rotational torque and the function of locking or semi-locking the output member are performed by separate members, there is a possibility that the timing of unlocking or semi-unlocking may differ from the timing at which the transmission of rotational torque begins. In this case, if rotational torque is reversely input to the output member during the period from when releasing the locked state or semi-locked state until when the transmission of rotational torque begins, the output member will be locked or semi-locked again.

In this example, since the engaging element 5 has both the function of transmitting rotational torque to the output member 4 and the function of locking or semi-locking the output member 4, it is possible to prevent occurrence of such inconvenience.

Further, since the direction of the force acting from the input member 3 to the engaging element 5 is opposite to the direction of the force acting from the output member 4 to the engaging element 5, the moving direction of the engaging element 5 can be controlled by regulating the magnitude relationship between the two forces. As a result, switching operation between the locked state or semi-locked state and the unlocked state of the output member 4 can be performed stably and reliably.

In particular, in the reverse input blocking clutch 1 of this example, the two held portions 43 of the leaf spring 6 are arranged on both sides of the input-side engaging portion 14 with respect to the second direction, and are elastically held between the input-side engaging portion 14 and the input-side engaged portion 34. As a result, when the input member 3 rotates, of the two held portions 43, the held portion 43 that is arranged on the front side of the input-side engaging portion 14 with respect to the direction of rotation of the input member 3 is required to be elastically compressed against the resistance force applied from the leaf spring 6 to the input-side engaging portion 14.

Therefore, even if a certain amount of gap with respect to the circumferential direction is respectively provided between the input-side engaging portion 14 and the input-side engaged portion 34 in order to ensure the workability of assembling the reverse-input blocking clutch 1, rattling of the input member 3 with respect to the engaging element 5 can be suppressed. As a result, with the reverse-input blocking clutch 1 of this example, the input-side engaging portion 14 and the input-side engaged portion 34 can be prevented from colliding forcefully even when releasing the locked state or semi-locked state, and generation of unpleasant noise due to the collision between the input-side engaging portion 14 and the input-side engaged portion 34 can be prevented.

In this example, as described above, the leaf spring 6 for suppressing rattling of the input member 3 is integrally manufactured by applying punching process or bending process to an elastic metal plate using a press. As a result, for example, compared to a case where two torsion coil springs are arranged on both side portions of the input-side engaging portion with respect to the second direction, the number of parts can be suppressed, and the manufacturing cost of the reverse-input blocking clutch 1 can be easily reduced.

In the reverse-input blocking clutch 1 of this example, the two held portions 43 apply elasticity having components in directions facing each other with respect to the second direction to the input-side engaging portion 14. Furthermore, the two held portions 43 have the same spring characteristics such as the spring constant and the free length. As a result, in a neutral state in which no torque is applied to either the input member 3 or the output member 4, the input-side engaging portion 14 can be positioned at the central position of the input-side engaged portion 34 with respect to the second direction.

In other words, regardless of the direction of rotation of the input member 3, the gaps with respect to the circumferential direction between the input-side engaging portion 14 and the input-side engaged portion 34 can be the same. As a result, when the direction of the rotational torque input to the input member 3 is reversed, the circumferential gap between the input-side engaging portion 14 and the input-side engaged portion 34 can be prevented from increasing, and the rattling of the input member 3 can be prevented from increasing.

However, in a case where high responsiveness is required only for rotation in one direction of the input member 3 and high responsiveness is not required for rotation in the other direction, it is also possible that the spring characteristics of the two held portions arranged between the input-side engaging portion and the input-side engaged portion which engage with each other is made different from each other.

When making the spring characteristics of the two held portions different, in a neutral state where no torque is applied to either the input member or the output member, of the gaps with respect to the circumferential direction between the input-side engaging portion and the input-side engaged portion, the gap that exists on the front side when the input member rotates in the one direction can be made smaller than the gap that exists on the front side when the input member rotates in the other direction. As a result, the responsiveness when the input member rotates in the one direction can be improved.

Further, with the reverse-input blocking clutch 1 of this example, the workability of assembly work can be improved.

When assembling the reverse-input blocking clutch 1, first, the input member 3 is rotatably supported inside the the input-side element, and the output member 4 is rotatably supported inside the output-side element 8 by the radial rolling bearing 27. Further, the leaf spring 6 is attached to the inside of the input-side engaged portion 34 of the engaging element 5, and the biasing member 49 is attached to the end portions on the inner side in the radial direction of the engaging element 5.

Next, the small diameter shaft portion 24 and the output-side engaging portion 21 of the output member 4 are inserted into the through hole 54 of the spacer 50 on the other side in the axial direction from the other side in the axial direction so as to bring the side surface on the other side in the axial direction of the spacer 50 on the other side in the axial direction and the side surface on the one side in the axial direction of the output flange portion 23 into contact.

Then, the two engaging elements 5 to which the leaf spring 6 and the biasing member 49 are assembled respectively are arranged between the output-side engaging portion 21 of the output member 4 and the pressed surface 7 provided on the inner peripheral surface of the output-side element 8.

Further, in a state where the phases with respect to the circumferential direction of the two input-side engaging portions 14 of the input member 3 rotatably supported inside the input-side element and the input-side engaged portions 34 of the two engaging elements 5 are matched, the input member 3 and the input-side element, and the output member 4 and the output-side element 8 are displaced in directions going toward each other with respect to the axial direction. Accordingly, the input-side element is fitted to the output-side element 8 without looseness, and the two input-side engaging portions 14 are inserted into the input-side engaged portions 34 respectively. Then, by coupling the input-side element and the output-side element 8 by coupling members, the reverse-input blocking clutch 1 is assembled.

In the reverse-input blocking clutch 1 of this example, at least one location of the outside surface in the radial direction of the base portion 44 of the leaf spring 6 is brought into contact with the outside surface 37 in the radial direction of the input-side engaged portion 34 facing toward the inner side in the radial direction. Specifically, in this example, the outside surface in the radial direction of the curved portion 45 is brought into contact with the concave curved surface portion 38 of the outside surface 37 in the radial direction of the input-side engaged portion 34. As a result, in a state before inserting the input-side engaging portion 14 of the input member 3 into the input-side engaged portion 34, the position of the leaf spring 6 inside the input-side engaged portion 34 can be determined. Therefore, the work of inserting the input-side engaging portion 14 into the input-side engaged portion 34 can be performed easily, and the workability of assembling the reverse-input blocking clutch 1 can be improved.

The order of assembling the reverse-input blocking clutch 1 may be switched and implemented simultaneously as long as no contradiction occurs.

The reverse-input blocking clutch 1 of this example includes the biasing member 49 that elastically biases the engaging element 5 in the direction bringing the pressing surface 33 closer to the pressed surface 7 with respect to the first direction. As a result, with the reverse-input blocking clutch 1 of this example, the locked state or semi-locked state can be switched promptly when rotational torque is reversely input to the output member 4. In other words, with the reverse-input blocking clutch of this example, locking performance can be well ensured.

In the reverse-input blocking clutch 1 of this example, the elasticity that the two held portions 43 apply to the engaging element 5 includes a component in a direction bringing the pressing surface 33 away from the pressed surface 7 with respect to the first direction. However, in this example, of the elasticity applied to the engaging element 5 by the biasing member 49, the component in the direction bringing the pressing surface 33 closer to the pressed surface 7 with respect to the first direction is made larger than the component of the elasticity applied to the engaging element 5 by the two held portions 43 in the direction bringing the pressing surface 33 away from the pressed surface 7 with respect to the first direction. Therefore, even in a case where the leaf spring 6 is provided, the engaging element 5 can be elastically biased in the directions bringing the pressing surface 33 closer to the pressed surface 7 with respect to the first direction in a neutral state in which no torque is applied to either the input member 3 or the output member 4.

Figure 12:
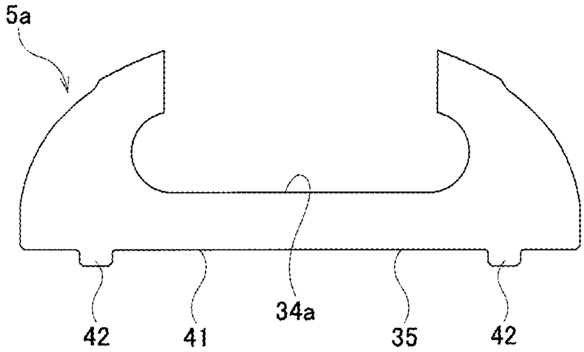
FIG. 12 is a front view illustrating another example of the engaging element.

In this example, the input-side engaged portion 34 provided in the engaging element 5 is configured by a through hole that pass through the engaging element 5 in the axial direction. However, in a case of implementing the present disclosure, for example, as illustrated in FIG. 12, the input-side engaged portion 34*a* can be configured by a notch that opens to the outside surface in the radial direction of the engaging element 5*a*. Alternatively, the input-side engaged portion can be configured by a bottomed hole that opens to only a side surface on the one side in the axial direction of the engaging element.

In a case of implementing the present disclosure, the materials of the input member, the output member, the pressed member, and the engaging element are not particularly limited. For example, as the materials for these members, a metal such as an iron alloy, copper alloy, and aluminum alloy, as well as synthetic resin mixed with reinforcing fiber as required, can be used. Further, the input member, the output member, the pressed member, and the engaging element may be made of the same material or different materials, respectively.

In a case of implementing the present disclosure, as long as the condition for the output member to be locked or semi-locked when rotational torque is reversely input to the output member is satisfied, a lubricant oil may be applied to the portions where the input member, the output member, the pressed member, and the engaging element come into contact with one another. Alternatively, at least one of the input member, the output member, the pressed member, and the engaging element may be made of an oil-retaining metal.

Second Example

Figure 13:
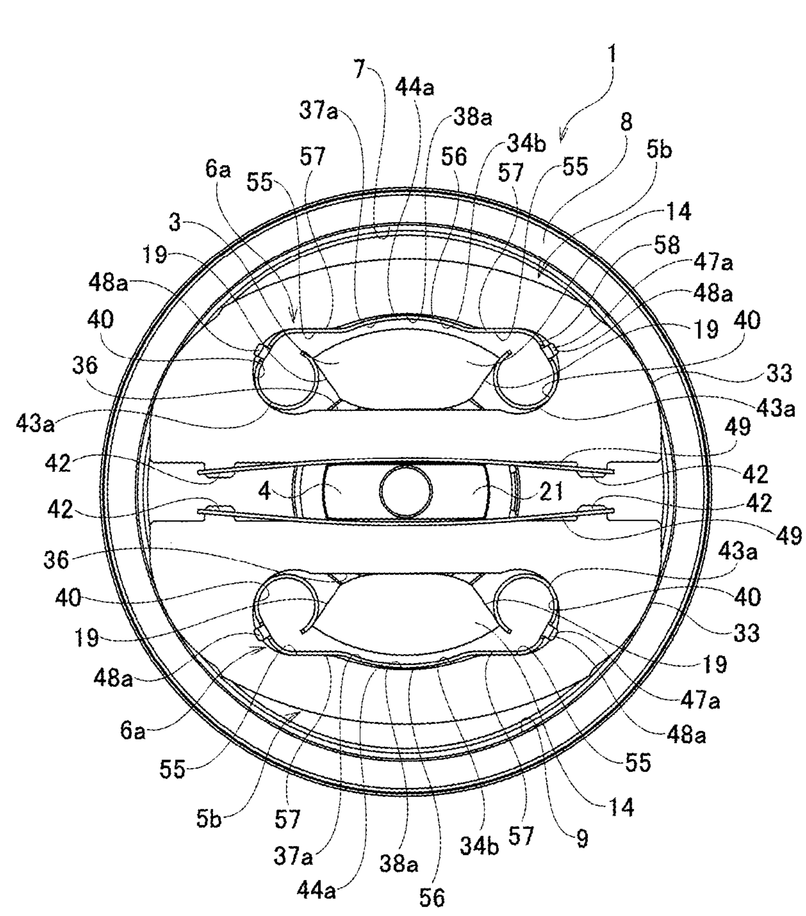
FIG. 13 is a drawing similar to FIG. 4, illustrating a reverse-input blocking clutch of a second example of an embodiment of the present disclosure.
Figure 14:
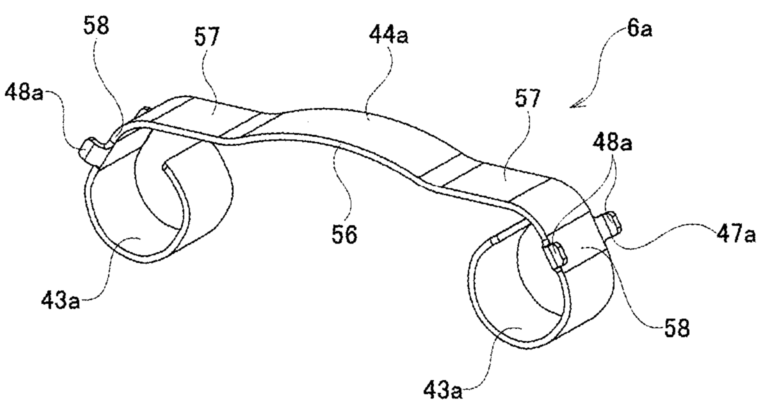
FIG. 14 is a perspective view of a leaf spring of the reverse-input blocking clutch of the second example.

A second example of an embodiment of the present disclosure will be described using FIG. 13 and FIG. 14. In this example, the opening shape of the input-side engaged portion 34*b* of the engaging element 5*b* and the shape of the leaf spring 6*a* are different from those in the first example.

In this example, of the inner surface of the input-side engaged portion 34*b*, the inside surface 36 in the radial direction facing toward the outer side in the radial direction is configured by a flat surface perpendicular to the first direction. Further, of the inner surface of the input-side engaged portion 34*b*, the outside surface 37*a* in the radial direction facing toward the inner side in the radial direction has a partially cylindrical concave curved surface portion 38*a* in the intermediate portion in the second direction, and has flat surface portions 55 on both side portions in the second direction of the engaging element 5*b*, the flat surface portions 55 being perpendicular to the radial direction of the engaging element 5. The side surfaces 40 in the circumferential direction that connect the end portions on both sides in the second direction of the inside surface 36 in the radial direction and the end portions on both sides in the second direction of the outside surface 37*a* in the radial direction are configured by partially cylindrical concave curved surfaces.

The leaf spring 6*a* has two held portions 43*a*, a base portion 44*a*, and a restricting portion 47*a*.

Each of the held portions 43*a* has an end surface shape that is substantially a half-circular arc shape when viewed from the axial direction. Each of the held portions 43*a* is held between a side surface 19 in the circumferential direction of the input-side engaging portion 14 and a side surface 40 in the circumferential direction of the input-side engaged portion 34*b* in an elastically reduced diameter state.

The base portion 44*a* has a curved portion 56, two flat plate portions 57, and two inclined plate portions 58.

The curved portion 56 is curved in partially cylindrical shape so that the outer side with respect to the radial direction of the engaging element 5*b* is convex.

The flat plate portions 57 are provided in portions adjacent to both sides of the curved portion 56 with respect to the second direction, each of which is configured by a rectangular flat plate perpendicular to the first direction.

The inclined plate portions 58 are bent at an obtuse angle from the end portions of the two flat plate portions 57 that are farther from each other with respect to the second direction toward the direction going away from the pressing surface 7 with respect to the first direction.

The restricting portion 47*a* has four bent pieces 48*a* which are bent from end portions on both sides in the axial direction of the inclined plate portions 58 toward the outer side in the radial direction, and arranged on both sides in the axial direction of portions of the engaging element 5*b* that are located around the side surfaces 40 in the circumferential direction.

The leaf spring 6*a* is arranged inside the input-side engaged portion 34*b* with a curved portion 56 of the base portion 44*a* elastically deformed so as to bring the two held portions 43 closer to each other, and each of the held portions 43*a* is held between a side surface 19 in the circumferential direction of the input-side engaging portion 14 and a side surface 40 in the circumferential direction of the input-side engaged portion 34*b* in an elastically compressed state. As a result, as each of the held portions 43*a* attempts to elastically restore its shape so as to expand in diameter, the outer circumferential surfaces near the tip end portions of the held portions 43*a* are elastically pressed against the side surfaces 19 in the circumferential direction of the input-side engaging portion 14. Further, as the curved portion 56 attempts to elastically restore its shape in a direction so as to bring the two held portions 43*a* away from each other and each of the held portions 43*a* attempts to elastically restore its shape so as to expand in diameter, of the outer circumferential surface of each of the held portions 43*a*, the portion that is located on the substantially opposite side of the portion that is in contact with the side surface 19 in the circumferential direction in the radial direction of the held portion 43*a* is elastically pressed against the side surface 40 in the circumferential direction of the input-side engaged portion 34*b*.

In this example, in a state where the leaf spring 6*a* is assembled inside the input-side engaged portion 34*b*, the outside surfaces in the radial direction of the flat plate portions 57 elastically come into contact with the flat surface portions 55 of the outside surface 37*a* in the radial direction of the input-side engaged portion 34*b*. As a result, before inserting the input-side engaging portion 14 of the input member 3 into the input-side engaged portion 34*b*, the position of the leaf spring 6*a* inside the input-side engaged portion 34*b* can be determined. The configurations and operational effects of the other parts are the same as those of the first example.

Third Example

Figure 15:
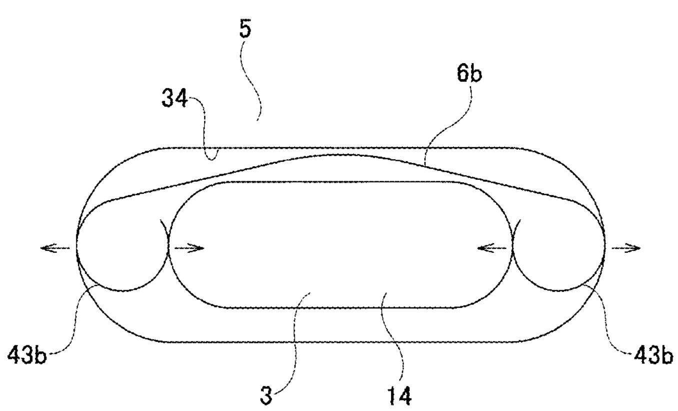
FIG. 15 is a schematic view illustrating major parts of a reverse-input blocking clutch of a third example of an embodiment of the present disclosure.

A third example of an embodiment of the present disclosure will be described using FIG. 15.

In this example, the two held portions 43*b* of the leaf spring 6*b* apply elasticity consisting of only components in directions facing each other with respect to the second direction to the input-side engaging portion 14 of the input member 3, and apply elasticity consisting of only a component in a direction going away from each other with respect to the second direction to the engaging element 5.

In other words, the elasticity applied by the two held portions 43*b* to the input-side engaging portion 14 does not include a component in the first direction, and the elasticity applied by the two held portions 43*b* to the engaging element 5 does not include a component in the first direction.

With the present example, since the leaf spring 6*b* does not prevent the biasing member 49 from biasing the engaging element 5 in the direction bringing the pressing surface 33 closer to the pressed surface 7 with respect to the first direction, the elasticity of the biasing member 49 can be minimized. Therefore, the magnitude of the minimum torque required to release the locked or semi-locked state of the reverse-input blocking clutch 1 (see FIG. 1 to FIG. 4, etc.) can be minimized, and the unlocking performance of switching the reverse-input blocking clutch 1 from the locked state or semi-locked state to the unlocked state can be well ensured. The configurations and operational effects of the other parts are the same as those of the first example.

Fourth Example

Figure 16:
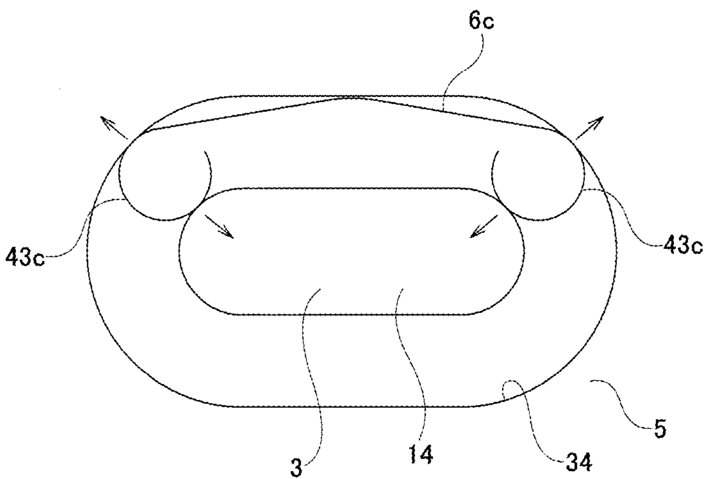
FIG. 16 is a drawing similar to FIG. 15, illustrating a reverse-input blocking clutch of a fourth example of an embodiment of the present disclosure.

A fourth example of an embodiment of the present disclosure will be described using FIG. 16.

In this example, the two held portions 43*c* of the leaf spring 6*c* apply elasticity to the input-side engaging portion 14 of the input member 3, the elasticity having components in directions facing each other with respect to the second direction and a component in a direction bringing the pressing surface 33 away from the pressed surface 7 with respect to the first direction, and apply elasticity to the engaging element 5, the elasticity having components in a direction going away from each other with respect to the second direction and a component in a direction bringing the pressing surface 33 closer to the pressed surface 7 with respect to the first direction.

With the present example, the engaging element 5 can be elastically biased by the two held portions 43*c* of the leaf spring 6*c* in the direction bringing the pressing surface 33 closer to the pressed surface 7 with respect to the first direction. As a result, the biasing member 49 can be omitted, alternatively, the elasticity of the biasing member 49 can be minimized. The configurations and operational effects of the other parts are the same as those of the first example.

REFERENCE SIGNS LIST

1 Reverse-input blocking clutch
2 Pressed member

3 Input member
4 Output member
5, 5*a*, 5*b* Engaging element
6, 6*a*, 6*b*, 6*c* Leaf spring
7 Pressed surface
8 Output-side element
9 Large diameter cylindrical surface portion
10 Small diameter cylindrical surface portion
11 Connecting surface portion
12 Inward flange portion
13 Screw hole
14 Input-side engaging portion
15 Input shaft portion
16 Input flange portion
17 Inside surface in the radial direction
18 Outside surface in the radial direction
19 Side surface in the circumferential direction
20 Curved surface portion
21 Output-side engaging portion
22 Output shaft portion
23 Output flange portion
24 Small diameter shaft portion
25 Flat surface
26 Convex curved surface
27 Radial rolling bearing
28 Outer ring
29*a*, 29*b* Retaining ring
30 Inner ring
31 Rolling body
32 Sliding bearing
33 Pressing surface
34, 34*a*, 34*b* Input-side engaged portion
35 Output-side engaged portion
36 Inside surface in the radial direction
37, 37*a* Outside surface in the radial direction
38, 38*a* Concave curved surface portion
39 Inclined surface portion
40 Side surface in the circumferential direction
41 Flat surface portion
42 Convex portion
43, 43*a*, 43*b*, 43*c* Held portion
44, 44*a* Base portion
45 Curved portion
46 Inclined plate portion
47, 47*a* Restricting portion
48 Bent piece
49 Biasing member
50 Spacer
51 Stopper member
52 Arm portion
53 Connecting portion
54 Through hole
55 Flat surface portion
56 Curved portion
57 Flat plate portion
58 Inclined plate portion

The invention claimed is:

1. A reverse-input blocking clutch, comprising:

a pressed member having a pressed surface around an inner peripheral surface thereof, an input member having an input-side engaging portion arranged on an inner side in a radial direction of the pressed surface, the input member being coaxially arranged with the pressed surface, an output member having an output-side engaging portion on the inner side in the radial direction of the pressed surface arranged further on the inner side in the radial direction than the input-side engaging portion, the output member being coaxially arranged with the pressed surface, an engaging element having a pressing surface facing the pressed surface, an input-side engaged portion engageable with the input-side engaging portion, and an output-side engaged portion engageable with the output-side engaging portion, the engaging element being arranged so as to be movable in a first direction which is a direction of the pressing surface going away from or toward the pressed surface, and a leaf spring having two held portions that are arranged on both sides of the input-side engaging portion with respect to a second direction perpendicular to a center axis of the input member and the first direction and are elastically held between the input-side engaging portion and the input-side engaged portion, and a base portion that connects the two held portions, when rotational torque is input to the input member, the engaging element moving in a direction away from the pressed surface with respect to the first direction based on engagement of the input-side engaging portion with the input-side engaged portion, and by engaging the output-side engaged portion with the output-side engaging portion, transmitting the rotational torque input to the input member to the output member, while, when rotational torque is reversely input to the output member, based on engagement of the output-side engaging portion with the output-side engaged portion, the engaging element pressing the pressing surface against the pressed surface so as to frictionally engage the pressing surface with the pressed surface.

2. The reverse-input blocking clutch according to claim 1, wherein the two held portions apply elasticity to the input-side engaging portion, the elasticity having components in directions facing each other with respect to the second direction and a component facing in a direction bringing the pressing surface closer to the pressed surface with respect to the first direction.

3. The reverse-input blocking clutch according to claim 2, wherein a biasing member is included that elastically biases the engaging element in a direction bringing the pressing surface closer to the pressed surface with respect to the first direction, and a component of elasticity applied from the biasing member to the engaging element in a direction bringing the pressing surface closer to the pressed surface with respect to the first direction is larger than a component of the elasticity applied from the two held portions to the engaging element in a direction moving the pressing surface away from the pressed surface with respect to the first direction.

4. The reverse-input blocking clutch according to claim 1, wherein the two held portions apply elasticity to the input-side engaging portion, the elasticity having only components in directions facing each other with respect to the second direction.

5. The reverse-input blocking clutch according to claim 1, wherein the two held portions apply elasticity to the input-side engaging portion, the elasticity having components in directions facing each other with respect to the second direction and a component facing a direction moving the pressing surface away from the pressed surface with respect to the first direction.

6. The reverse-input blocking clutch according to claim 1, wherein the leaf springs includes a restricting portion regulating relative displacement thereof in an axial direction with respect to the engaging element.

7. The reverse-input blocking clutch according to claim 6, wherein the restricting portion has bent pieces that are bent from end portions on both sides in the axial direction of the two held portions or the base portion, and are arranged on both sides in the axial direction of portions around the input-side engaged portion of the engaging element.

8. The reverse-input blocking clutch according to claim 1, wherein at least one location of the base portion is brought into contact with a portion of an inner surface of the input-side engaged portion facing the inner side in the radial direction.

9. The reverse-input blocking clutch according to claim 1, wherein the engaging element is configured by two engaging elements, and the input-side engaging portion is configured by two input-side engaging portions.

* * * * *